United States Patent
Yamaguchi et al.

(10) Patent No.: US 9,088,193 B2
(45) Date of Patent: Jul. 21, 2015

(54) MOTOR EXCITING DEVICE AND MOTOR EXCITING METHOD AND MOTOR CONTROL DEVICE AND MOTOR CONTROL METHOD

(71) Applicants: AIDA ENGINEERING, LTD., Sagamihara-shi, Kanagawa (JP); Hitachi Industrial Equipment Systems Co., Ltd., Narashino-shi, Chiba (JP)

(72) Inventors: Yoshihiro Yamaguchi, Sagamihara (JP); Hiroshi Nagase, Sagamihara (JP); Fumio Tajima, Sagamihara (JP); Masataka Yahara, Narashino (JP); Yukinari Fujisawa, Narashino (JP)

(73) Assignees: Aida Engineering, Ltd., Kanagawa (JP); Hitachi Industrial Equipment Systems Co., Ltd., Tokyo (JP)

( * ) Notice: Subject to any disclaimer, the term of this patent is extended or adjusted under 35 U.S.C. 154(b) by 187 days.

(21) Appl. No.: 13/939,784

(22) Filed: Jul. 11, 2013

(65) Prior Publication Data
US 2014/0028230 A1    Jan. 30, 2014

(30) Foreign Application Priority Data
Jul. 18, 2012  (JP) .................................. 2012-159610

(51) Int. Cl.
| H02P 6/00 | (2006.01) |
| H02K 11/00 | (2006.01) |
| H02P 6/16 | (2006.01) |

(52) U.S. Cl.
CPC ............ *H02K 11/0031* (2013.01); *H02P 6/001* (2013.01); *H02P 6/16* (2013.01)

(58) Field of Classification Search
CPC ..... B62D 5/046; H02P 21/0089; H02P 21/06; H02P 2207/05; H02P 25/026; H02P 27/08; H02P 6/16; H02P 8/38; H02P 21/04; H02P 2209/07; H02P 8/14; H02P 8/22
USPC ................................ 318/400.38, 400.35, 433
See application file for complete search history.

(56) References Cited

U.S. PATENT DOCUMENTS

| 6,992,451 | B2 * | 1/2006 | Kamio et al. ............... 318/400.4 |
| 7,248,006 | B2 * | 7/2007 | Bailey et al. ............... 318/400.4 |
| 7,265,505 | B2 * | 9/2007 | Nakai et al. ............... 318/400.09 |
| 7,339,346 | B2 * | 3/2008 | Ta et al. ......................... 318/807 |
| 7,463,006 | B2 * | 12/2008 | Ta et al. ......................... 318/807 |
| 2012/0056572 | A1 * | 3/2012 | Bigler et al. .................. 318/570 |

FOREIGN PATENT DOCUMENTS

JP      09-219989 A      8/1997

* cited by examiner

*Primary Examiner* — Rita Leykin
(74) *Attorney, Agent, or Firm* — McDermott Will & Emery LLP

(57) ABSTRACT

A motor control device which can determine a magnetic pole position for a magnetic pole position detector included in a permanent magnet motor in which the reluctance torque proportion is larger than the magnet torque proportion is provided. In a permanent magnet synchronous motor having multi-phase windings of N axes (N≥2), the windings of optionally selected K axes (K≤N) are DC excited using corresponding independent power supplies.

20 Claims, 11 Drawing Sheets

MOTOR EXCITING DEVICE AND MOTOR EXCITING METHOD AND MOTOR CONTROL DEVICE AND MOTOR CONTROL METHOD

FIELD OF THE INVENTION

The present invention relates to a control device for a permanent magnet synchronous motor (hereinafter referred to as a "PMSM") and, more particularly, to a motor exciting device for determining a magnetic pole position for a magnetic pole position detector included in the PMSM.

BACKGROUND OF THE INVENTION

A PMSM controls the motor current based on the magnetic pole position of its rotor, so that it has a magnetic pole position detector for magnetic pole position detection. When a magnetic pole position detector is initially attached to the motor shaft while the motor is still in the process of being manufactured, the positional relationship between the magnetic pole position of the rotor and the magnetic pole position detector is not known. Hence, it is necessary to determine positional relationship between the rotor magnetic pole position and the magnetic pole position detector. In Japanese Patent Laid-Open No. H09 (1997)-219989, a method of such magnetic pole position determination using an encoder as a magnetic pole position detector is disclosed.

When a motor and an encoder is initially combined, only the absolute zero position of the encoder itself is established. In this state, a positive current is applied to the well-known V-phase and W-phase windings (not shown) of the motor and a negative current is applied to the well-known U-phase winding of the motor causing a DC current to flow through the motor and the motor to stop at a stable point. At this time, positional error $\delta$ between the absolute zero position of the encoder and the stable stopping point of the motor is read and is written to a memory. Subsequently, the motor is operated based on the magnetic pole position while the positional error $\delta$ is corrected using an encoder count value.

SUMMARY OF THE INVENTION

The known method described above is effective for a general PMSM in which the reluctance torque is smaller than the magnet torque. However, when the known method is applied to a motor in which the reluctance torque is larger than the magnet torque (for example, a permanent magnet assisted synchronous reluctance motor (hereinafter referred to as a "PRM") described in Japanese Patent Laid-Open No. 2011-83066), the stable stopping point is not fixed, i.e. more than one stable stopping point occurs. This problem will be described below with reference to drawings.

The stable stopping point of a motor where the motor stops when a DC current is applied to the motor will be described below. FIG. 1 shows relationships between the current vectors of d-axis and q-axis windings and current phase angle $\beta$. In FIG. 1, the d-axis direction represents the direction of the rotor N pole, and the q-axis direction represents a direction electrically ahead of the d-axis direction in phase by $\pi/2$. Also, in FIG. 1, the phase angle between the direction of current vector Ia and the q axis is denoted by $\beta$. The q axis is in the same direction as the vector direction of a no-load induced electromotive force. The d axis and the q axis are rotating coordinate axes which rotate in synchronization with the rotor. The positive rotational direction of the d and q axes is counterclockwise (mathematical positive direction). The negative rotational direction of the d and q axes is therefore clockwise.

FIG. 2 shows the relationship between current phase angle $\beta$ and torque in a general PMSM. The $\beta$-torque characteristic shown in FIG. 2 has a periodicity of $2\pi$, and the torque is 0 at point A ($\beta=\beta 0$) and at point B ($\beta=\beta 1$). The behavior of the motor rotor caused by DC excitation at current phase angle $\beta$ will be described below for the following four ranges of current phase angle $\beta$.

$$-\pi \le \beta < \beta 0 \quad (1)$$

With the torque being negative, the rotor generates a clockwise torque. This causes, with the direction of the current vector shown in FIG. 1 unchanged, the d and q axes to rotate clockwise and the current phase angle $\beta$ increases. When, subsequently, $\beta=\beta 0$ occurs at point A, the torque becomes 0 and the rotor stops.

$$\beta=\beta 0 \text{ or } \beta=\beta 1 \quad (2)$$

With the torque being 0, the rotor is stationary.

$$\beta 0 < \beta < \beta 1 \quad (3)$$

With the torque being positive, the rotor generates a counterclockwise torque. This causes, with the direction of the current vector shown in FIG. 1 unchanged, the d and q axes to rotate counterclockwise and the current phase angle $\beta$ decreases. When, subsequently, $\beta=\beta 0$ occurs, the rotor stops counterclockwise rotation.

$$\beta 1 < \beta 0 \le \pi \quad (4)$$

With the torque being negative, the rotor stops, like in the case of (1) above, when $\beta=\beta 0$ occurs.

It is known from (1) to (4) above that, when the current phase angle $\beta$ at the moment of DC excitation is $\beta \ne \beta 1$, the rotor moves to cause occurrence of $\beta=\beta 0$ and stably stops at the point where $\beta=\beta 0$. Also, the stable stopping point $\beta 0$ can be said to be a point which is reached as the current phase angle $\beta$ increases and at which the torque changes from being negative to being positive. When $\beta=\beta 1$ occurs, the torque also becomes 0 and the rotor stops, but the stopped state of the rotor at that point is very unstable and even a slight change in the direction of magnetomotive force causes the rotor to rotate toward the stable stopping point of $\beta=\beta 0$. Hence, stopping of the motor at the point of $\beta=\beta 1$ causes almost no practical problem.

Namely, referring to the $\beta$-torque characteristic shown in FIG. 2, the stable stopping point is where the current phase angle $\beta$ becomes 0 causing the torque to change from being negative to being positive.

Next, torque equations concerning the current phase angle $\beta$ of a PMSM will be described. The following PMSM torque equations are generally known:

$$\tau = p[ke \times iq + (Ld-Lq) \times id \times iq] \quad (1)$$

$$Id = id/\sqrt{3} = -Ia \times \sin\beta \quad (2)$$

$$Iq = iq/\sqrt{3} = Ia \times \cos\beta \quad (3)$$

where, in terms of PMSM equivalent circuit constants, Ld represents direct axis inductance, Lq represents horizontal axis inductance, ke represents an induced electromotive force constant, and p represents a number of pole pairs; and where, with reference to FIG. 1, Id ($=id/\sqrt{3}$) represents the current component in the d-axis direction of current vector Ia (equal in magnitude to the effective current value) and Iq ($=iq/\sqrt{3}$) represents the current component in the q-axis direction of current vector Ia.

From equations (1), (2), and (3), torque τ generated by the motor can be represented as follows:

$$\tau = p[ke \times iq + (Ld - Lq) \times id \times iq] \quad (4)$$
$$= p[ke \times Ia \times \cos\beta \times \sqrt{3} - (3/2) \times (Ld - Lq) \times Ia^2 \times \sin 2\beta]$$
$$= A \times Ia \times [\cos\beta + B \times Ia \times \sin 2\beta] \ (-\pi \leq \beta \leq \pi)$$

where A and B each represent a constant, Ia represents the magnitude of the current vector (effective current value), Ia is larger than 0 (Ia>0), and A is larger than 0 (A>0).

In equation (4), the first term in parentheses represents a torque (generally called a magnet torque) given by the product of the number of magnetic fluxes and the value of current) and the second term in parentheses represents a reluctance torque generated by an reluctance torque effect. Equation (4) applies to a general PMSM having single-axis windings only (a set of three-phase windings). In the case of a motor having plural-axis windings, the total torque generated by the motor can be calculated by calculating the torque generated by the windings of each axis using equation (4) and adding up the torques generated by the windings of the plural axes.

The torque represented by equation (4) can be classified into the following three cases according to the value of B×Ia.

$$-\tfrac{1}{2} \leq B \times Ia \leq \tfrac{1}{2} \quad (1)$$

A general PMSM in which the reluctance torque proportion is small falls in this case. In this case, the torque represented by equation (4) can be plotted as shown in FIG. 3 with the horizontal axis representing current phase angle β and the vertical axis representing torque τ. As shown in FIG. 3, in the range of $-\pi \beta < \pi$, there is only one stable stopping point β0 (a point at which the torque changes from being negative to being positive with β increasing). The stable stopping point β0 is $-\pi/2$ (i.e. β0=$-\pi/2$) and it is not dependent on motor constants. Particularly, when B=0 (i.e. Ld=Lq), only the magnet torque term is left and the β-torque characteristic becomes sinusoidal as shown in FIG. 2.

The above description indicates that, when the motor is DC excited, there is only one stable stopping point β0 (=$-\pi/2$) and that the N pole position of the rotor is attracted toward the direction of the current vector so as to cause the rotor to stop at the stable stopping point.

$$B \times Ia > \tfrac{1}{2} \quad (2)$$

The above-described PRM in which the reluctance torque proportion is large falls in this case. For example, when B×Ia=0.8, the torque represented by equation (4) can be plotted as shown in FIG. 4. As shown in FIG. 4, in the range of $-\pi \leq \beta < \pi$, there are two stable stopping points (i.e. point A and point B). Therefore, the current phase angle β at which the motor will be stabilized when DC excited depends on the phase at which the motor was previously stationary. With the two stable stopping points existing, which one of them will apply cannot be determined, so that the d-axis phase (β0=$-\pi/2$) cannot be specified based on a stable stopping point. In this case, therefore, the magnetic pole position cannot be determined. Moreover, the stable stopping points are affected by motor constants and they cannot be uniquely determined.

$$B \times Ia > -\tfrac{1}{2} \quad (3)$$

Like the case described in (2) above, this case applies to a motor in which the reluctance torque proportion is large. In this case, the torque represented by equation (4) can be plotted as shown in FIG. 5. As shown in FIG. 5, in the range of $-\pi \leq \beta < \pi$, there are two stable stopping points β0. In this case, unlike in the above case of B×Ia>½, the two stable stopping points β0 occur at $-\pi/2$ and $\pi/2$, respectively, without being affected by any motor constant. In this case, too, like in the above case of B×Ia>½, the current phase angle β at which the motor will be stabilized when DC excited depends on the phase at which the motor was previously stationary. With the two stable stopping points existing, which one of them will apply cannot be determined, so that the d-axis phase (β0=$-\pi/2$) cannot be specified based on a stable stopping point. In this case, therefore, the magnetic pole position cannot be determined.

As stated in the foregoing, the present invention has been made for application to motors in which the reluctance torque proportion is large, and it is an object of the present invention to provide a motor exciting device and motor exciting method for permanent magnet motor which can be used to determine a magnetic pole position for a magnetic pole position detector included in a permanent magnet motor with a large reluctance torque proportion.

To solve the above problem, the present invention provides a motor exciting device for selecting a plurality of optional axes of a permanent magnet synchronous motor having multiple-phase windings of as many as N axes (N≥2) and positionally relating an encoder and the magnetic pole position of the motor by independently exciting the windings of each of the selected plurality of axes. The motor exciting device includes: an exciting current command unit which generates exciting current commands for the selected plurality of axes totaling K sets (K≤N); exciting devices for individual axes which receive the exciting current commands and supply DC exciting currents to the windings of the K sets of axes; and a storage unit which stores an encoder value. In the motor exciting device: the exciting devices for individual axes DC-excite the windings of the K sets of axes based on the exciting current commands such that the magnetomotive forces of the windings of the K sets of axes are shifted in phase from one another by π/K; and an encoder value collected when the motor is stably stopped by the DC excitation is stored in the storage unit as an initial position.

In the motor exciting device, the exciting devices for individual axes DC-excite the windings of the K sets of axes based on the exciting current commands such that the magnetomotive forces of the windings of the K sets of axes are equal.

In the motor exciting device, in DC-exciting a permanent magnet synchronous motor, the exciting devices for individual axes each supply a current which gradually increases to a prescribed value.

In the motor exciting device, in DC-exciting a permanent magnet synchronous motor, the exciting devices for individual axes each supply a current of a prescribed value and increase the current when the rotor of the motor stops or the rotational displacement thereof becomes zero.

The motor exciting device further includes a correction unit which corrects the rotational position of the encoder based on the initial position stored in the storage unit and which outputs a rotational position signal for controlling the motor.

Also, to solve the above problem, the present invention provides a motor exciting method for selecting a plurality of optional axes of a permanent magnet synchronous motor having multiple-phase windings of as many as N axes (N≥2) and positionally relating an encoder and the magnetic pole position of the motor by independently exciting the windings of each of the selected plurality of axes. The motor exciting method includes: an exciting current command unit which generates exciting current commands for the selected plurality of axes totaling K sets (K≤N); exciting devices for individual axes which receive the exciting current commands and supply DC exciting currents to the windings of the K sets of axes; and a storage unit which stores an encoder value. In the motor exciting method: the exciting devices for individual axes DC-excite the windings of the K sets of axes based on the exciting current commands such that the magnetomotive forces of the windings of the K sets of axes are shifted in phase from one another by $\pi/K$; and an encoder value collected when the motor is stably stopped by the DC excitation is stored in the storage unit as an initial position.

According to claims 1, 2, 6, and 7 of the present invention, the sum of reluctance torques generated by the windings of the respective axes of a motor as a whole is 0, so that there is only one stable stopping point β0. Since the stable stopping point is dependent on K, i.e. the number of axes each having a set of windings to be DC excited, without being affected by any motor constant, the magnetic pole position (N pole position) of the motor can be easily calculated based on the stable stopping point β0.

According to claims 3, 4, 8, and 9 of the present invention, in the process of magnetic pole position determination, no vibratory torques are generated, and the motor can be quickly stopped at a stable stopping point. Since the torque can be increased when the motor rotor nears the stable stopping point, the magnetic pole position can be determined with high accuracy.

According to claims 5 and 10 of the present invention, a motor in which the reluctance torque proportion is large can also be controlled like a general PMSM (a motor in which the reluctance torque proportion is small) by detecting a stable stopping point according to claims 1, 2, 6, and 7, then making calculation to correct the magnetic pole position.

DESCRIPTION OF THE PREFERRED EMBODIMENT

An embodiment of the present invention will be described below with reference to drawings.

First Embodiment

Figure 1:
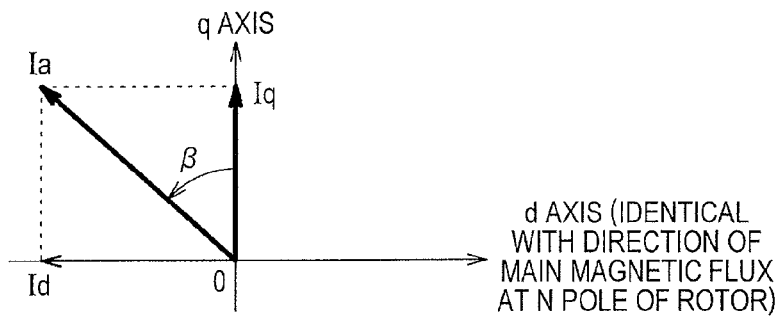
FIG. 1 is a diagram showing the phase of a current.
Figure 2:
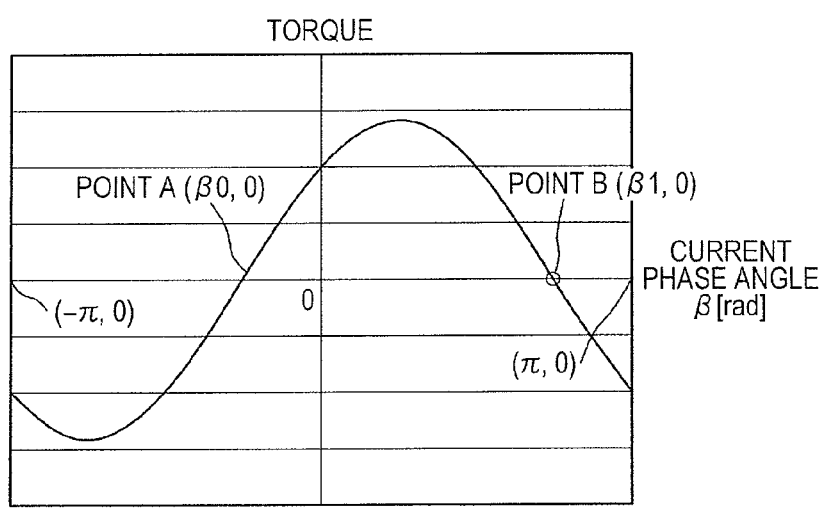
FIG. 2 is a diagram showing the relationship between torque and current phase angle.
Figure 3:
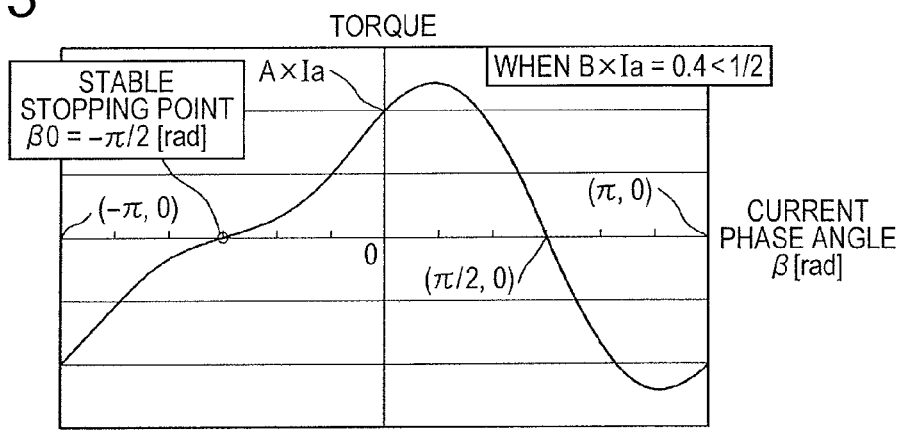
FIG. 3 is a diagram for explaining the relationship between current phase angle β represented by equation (4) and torque in the case of $-\frac{1}{2} \leq B \times Ia \leq \frac{1}{2}$ and a safe stopping point β0 reached when the motor is DC excited.
Figure 4:
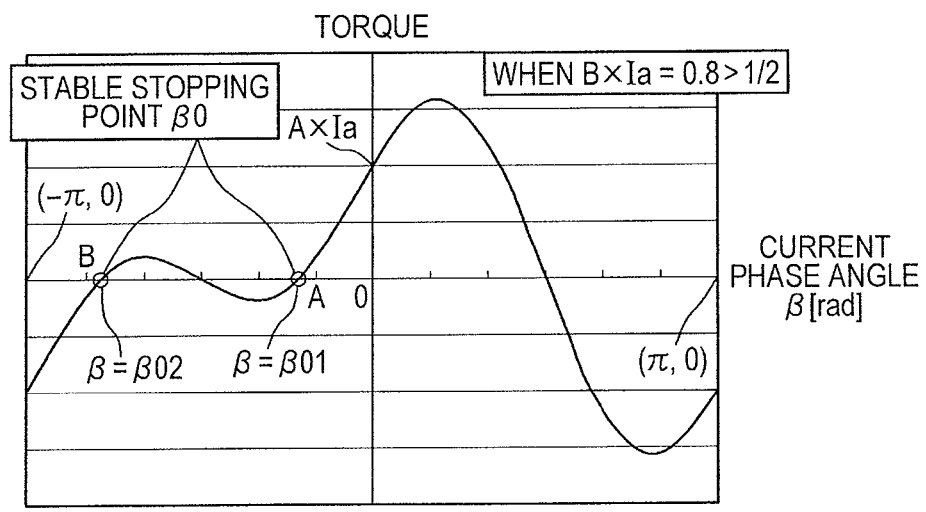
FIG. 4 is a diagram for explaining the relationship between current phase angle β represented by equation (4) and torque in the case of $B \times Ia > \frac{1}{2}$ and a safe stopping point β0 reached when the motor is DC excited.
Figure 5:
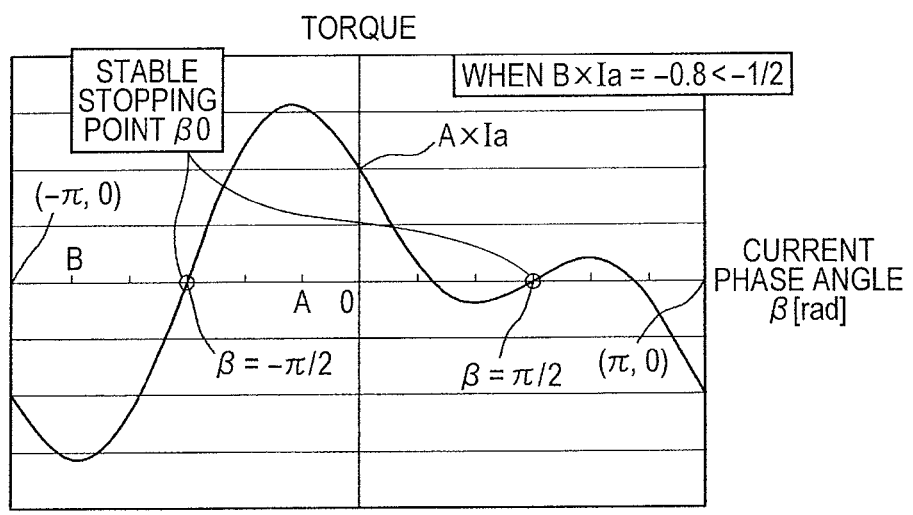
FIG. 5 is a diagram for explaining the relationship between current phase angle β represented by equation (4) and torque in the case of $B \times Ia < -\frac{1}{2}$ and a safe stopping point β0 reached when the motor is DC excited.
Figure 6:
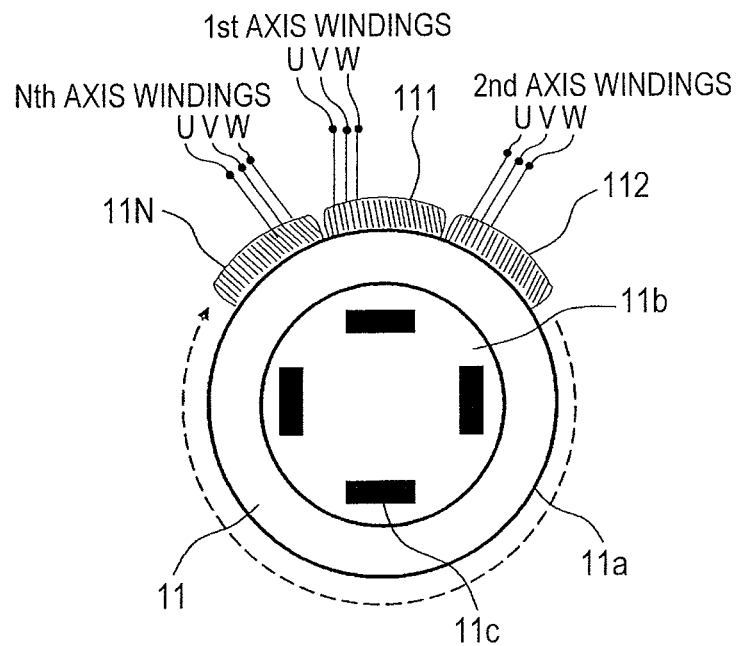
FIG. 6 is a sectional view of a motor according to a first embodiment of the present invention.

FIG. 6 is a sectional view of the internal structure of a motor 11 according to the present embodiment. The motor 11 is a plural-axis winding motor having plural three-phase windings with winding terminals drawn out from inside the motor. The plural-axis three-phase windings are referred to as the first-axis windings 111, second-axis windings 112, - - - , and Nth-axis windings 11N (where N≥2), respectively. The number of the plural-axis winding sets is referred to as the number of axes. In the present embodiment, the motor 11 will be described as a three-phase motor, but the intent of the present application can be achieved even in cases where the motor 11 is a polyphase motor.

Figure 7:
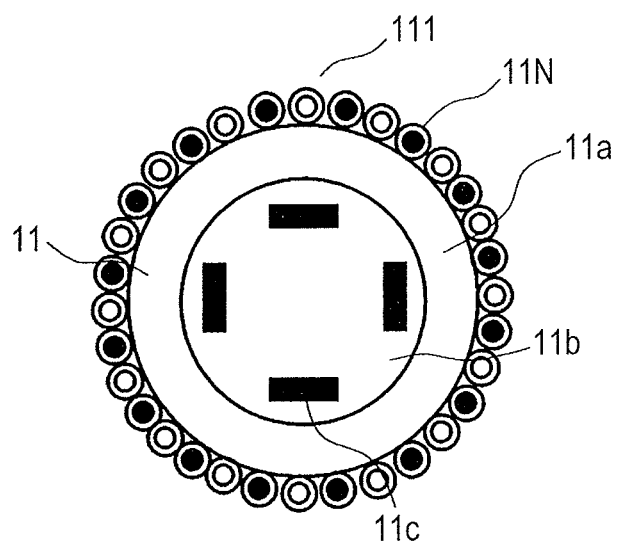
FIG. 7 is a sectional view of another motor according to the first embodiment of the present invention.

The plural-axis winding motor 11 differs from a general single-axis winding motor as follows. Referring to FIG. 6, the first-axis windings 111, the second-axis windings 112, - - - , the Nth-axis windings 11N are sequentially arranged in a circumferential direction of a motor stator 11a. The winding terminals of each axis are drawn to outside the motor. The plural-axis windings shown in FIG. 6 are wound to be free of interference between them, but no problem will be caused even if the windings are wound to have portions where they mutually interfere. Or, as seen in the sectional view shown in FIG. 7, the windings on the stator 11a including the first-axis windings 111, the second-axis windings 112, - - - , the Nth-axis windings 11N may be wound in an interleaved manner over the whole circumference of the stator 11a.

Connecting the windings of the plural-axis winding motor 11 in series or in parallel inside the motor and drawing the terminals of the plural-axis windings thus connected to outside the plural-axis winding motor 11 as single-axis windings makes a general single-axis winding motor. In terms of internal electromagnetic phenomena taking place in motors, therefore, the above plural-axis winding motor and a general single-axis winding motor are identical to each other. A rotor 11b is positioned inside the stator 11a and has permanent magnets 11c evenly disposed over its surface or inside it. In the examples shown in FIGS. 6 and 7, four permanent magnets 11c are evenly disposed in the circumferential direction. When the windings of the plural-axis winding motor 11 are DC excited, the rotor 11b generates a torque and stops at a safe stopping position.

The plural-axis winding motor 11 is driven by the inverters provided for the plural axes on a one-to-one basis with each inverter being independent of the others. While the plural-axis winding motor 11 requires the plural inverters, the capacity of each of the plural inverters can be as small as the capacity of the inverter used in a comparable single-axis winding motor divided by the number of axes of the plural-axis winding motor 11. Namely, the plural-axis winding motor 11 can make use of small-capacity inverters.

Figure 8:
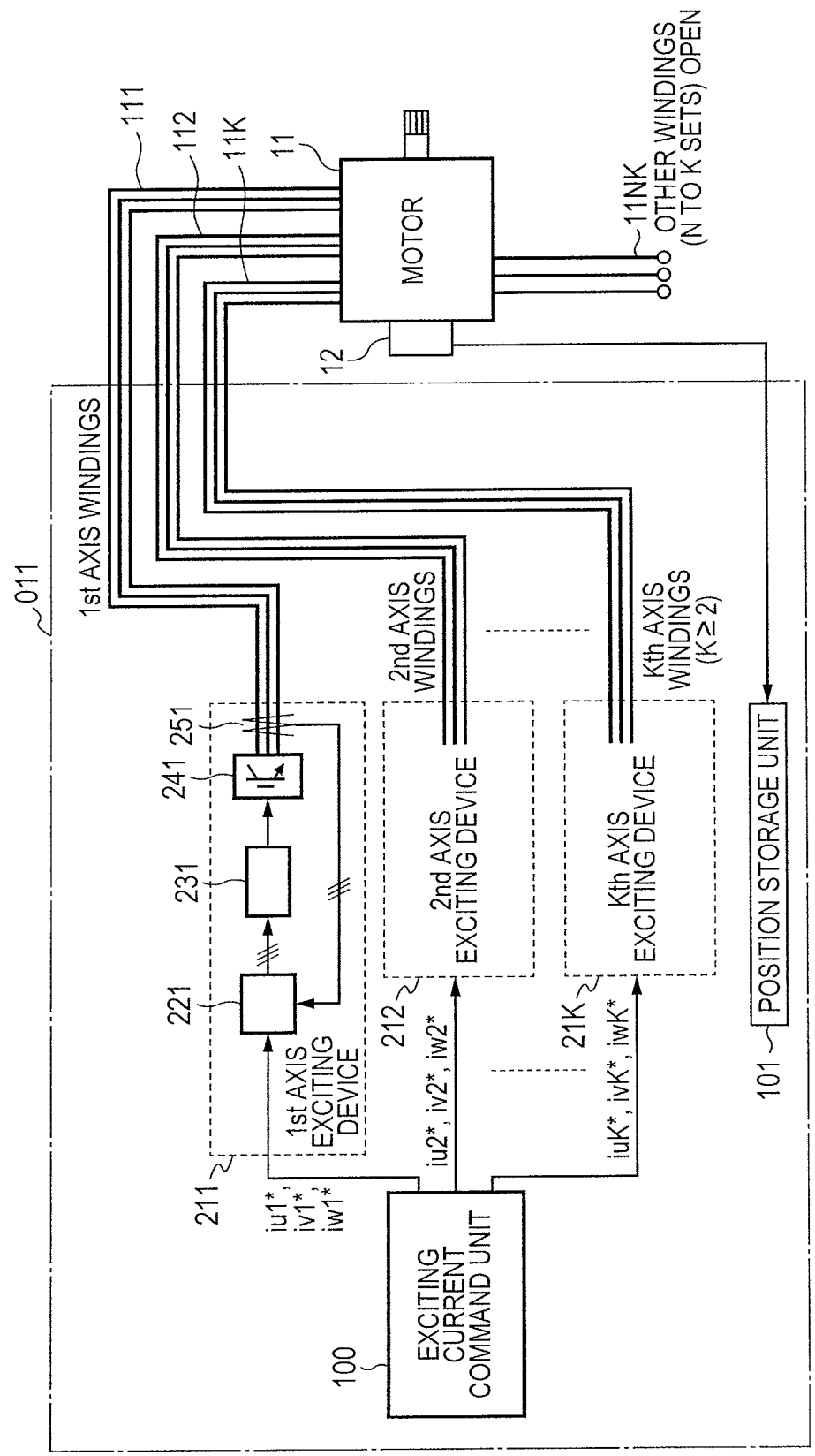
FIG. 8 is an overall view of a motor exciting device and the motor according to the first embodiment.

FIG. 8 is an overall schematic view of a motor exciting device and the plural-axis winding motor 11 to which the motor exciting device is connected. In FIG. 8, reference numerals identical to those used in FIGS. 6 and 7 denote identical parts as denoted in FIGS. 6 and 7. An encoder 12 is for detecting the magnetic pole position of the plural-axis winding motor 11 and is connected to the rotary shaft of the plural-axis winding motor 11. An exciting current command unit 100 used for magnetic pole position determination supplies excitation current commands to the plural-axis three-phase windings of the plural-axis winding motor 11.

In FIG. 8, reference numerals 211, 212, - - -, 21K respectively denote a first-axis exciting device, a second-axis exciting device, - - -, a Kth-axis exciting device which supply electric currents to the first-axis windings 111, the second-axis windings 112, - - -, a Kth-axis windings 11K (K≤N), respectively. The first-axis exciting device 211 includes a current control unit (ACR) 221, a PWM control unit 231, an inverter 241, and a current detector 251.

DC exciting current commands iu1*, iv1*, iw1* from the exciting current command unit 100 are inputted to the current control unit (ACR) 221 included in the first-axis exciting device 211. The current control unit (ACR) 221 outputs three-phase signals in accordance with the deviation between itself and the current detector 251 that detects the actual output currents. The PWM control unit 231 operating based on the outputs of the current control unit (ACR) 221 PWM-controls the inverter 241 causing the inverter 241 to supply DC exciting currents to the first-axis windings 111. Thus, the DC exciting currents flowing through the first-axis windings 111 are controlled to assume values corresponding to the command signals from the exciting current command unit 100.

The exciting current command unit 100 also outputs DC exciting current commands iu2*, iv2*, iw2* to the second-axis exciting device 212. The second-axis exciting device 212 is configured similarly to the first-axis exciting device 211, and the DC exciting currents flowing through the second-axis windings 112 are controlled to assume values corresponding to the command signals from the exciting current command unit 100.

Similarly, the exciting current command unit 100 also outputs DC exciting current commands iuK*, ivK*, iwK* to the Kth-axis exciting device 21K. The DC exciting currents flowing through the Kth-axis windings 11K are controlled to assume values corresponding to the command signals from the exciting current command unit 100. The windings of the other axes 11NK (N to K sets) that are not excited are left in an open state.

When the three-phase exciting current commands for the three-phase windings of each axis are equalized as represented by the following equations (5), (6), and (7), the total torque of the plural-axis winding motor 11 having plural-axis windings can be calculated by multiplying the torque value obtained using the foregoing equation (4) by K, i.e. the number of axes. This is represented by the following equation (8).

$$iu1^* = iu2^* = \text{- - -} = iuK^* \tag{5}$$

$$iv1^* = iv2^* = \text{- - -} = ivK^* \tag{6}$$

$$iw1^* = iw2^* = \text{- - -} = iwK^* \tag{7}$$

$$\tau = K \times A \times Ia \times [\cos\beta + B \times Ia \times \sin 2\beta](-\pi \leq \beta \leq \pi) \tag{8}$$

The expression enclosed in brackets is the same between equation (8) and equation (4). As also described in the foregoing, when $B \times Ia > 1/2$ or $B \times Ia < -1/2$, there are two stable stopping points β0 which may be reached by a motor (a motor with a large reluctance torque proportion, for example, a PRM) when the motor is DC excited and which one of the two stopping points applies cannot be determined. Hence, it is not possible to determine the d-axis phase (β=−π/2) based on a stopping point, and the magnetic pole position cannot be determined. Moreover, as also described in the foregoing, when $B \times Ia > 1/2$, the stable stopping point β0 is affected by motor constants, so that it cannot be uniquely determined.

This problem can be solved, as represented by the following equations, by arranging the current commands of U, V and W phases supplied to the windings of each axis such that the three-phase windings are DC excited by currents which are shifted in phase from one another by π/K each and which have equal magnetomotive forces.

Namely, for the first, second, - - -, Kth axes, equal magnetomotive forces shifted in electrical phase by π/K each can be obtained by exciting the windings of the respective axes as follows.

For First-Axis Windings 111:

$$iu1^* = \sqrt{2} \times Ia \times \sin(\phi - 2\pi/3) \tag{9}$$

$$iv1^* = \sqrt{2} \times Ia \times \sin(\phi - 2\pi/3) \tag{10}$$

$$iw1^* = \sqrt{2} \times Ia \times \sin(\phi + 2\pi/3) \tag{11}$$

For Second-Axis Windings 112:

$$iu2^* = \sqrt{2} \times Ia \times \sin(\phi - \pi/K) \tag{12}$$

$$iv2^* = \sqrt{2} \times Ia \times \sin(\phi - \pi/K - 2\pi/3) \tag{13}$$

$$iw2^* = \sqrt{2} \times Ia \times \sin(\phi - \pi/K + 2\pi/3) \tag{14}$$

For Kth-Axis Windings 11K:

$$iuK^* = \sqrt{2} \times Ia \times \sin(\phi - (K-1)\pi/K) \tag{15}$$

$$ivK^* = \sqrt{2} \times Ia \times \sin(\phi - (K-1)\pi/K - 2\pi/3) \tag{16}$$

$$iwK^* = \sqrt{2} \times Ia \times \sin(\phi - (K-1)\pi/K + 2\pi/3) \tag{17}$$

In the above equations, φ represents a constant phase value arbitrarily determined in a range of 0 to 2π for excitation to be performed. Equations (9) to (17) may be said to each represent a current command value at a certain moment with a three-phase AC current supplied to the respective windings of U, V and W phases. Hence, Ia (current vector magnitude) in each of equations (9) to (17) is equivalent to an effective current value. It equals and corresponds to Ia in the foregoing equation (4). This applies regardless of the excitation phase p as is obvious from the above.

Based on the foregoing equation (4), the total torque generated by the motor can be calculated by adding up the torques generated by supplying exciting currents shifted in phase from one another by π/K to the windings of the respective axes as follows.

$$\tau = \Sigma A \times Ia \times [\cos(\beta - m\pi/K) + B \times Ia \times \sin(2(\beta - m\pi/K))](-\pi \leq \beta \leq \pi, K \geq 2) \tag{18}$$

In equation (18), Σ represents adding up the terms of Σ for m=0 through K−1.

When the terms of Σ is added up for m=0 through K−1 based on equation (18), the sum of reluctance torques of the second term of Σ becomes 0 as follows.

$$\tau = A \times Ia \times \sin[\beta + \pi/(2K)]/\sin[\pi/(2K)](-\pi \leq \beta \leq \pi, K \geq 2) \tag{19}$$

Figure 9:
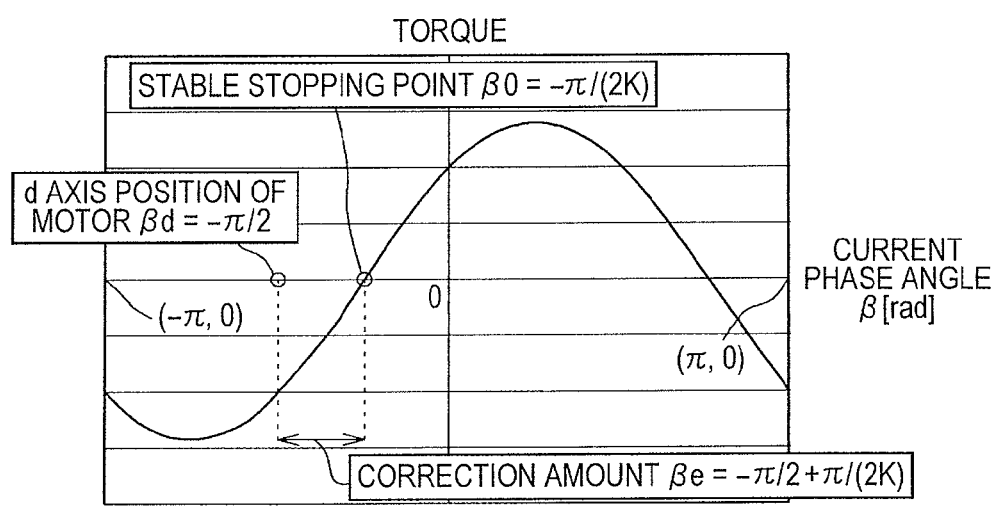
FIG. 9 is a diagram for explaining the total torque generated, to change with the current phase angle, by a motor when the windings of K axes are excited with a phase difference of $\pi/K$ each.

FIG. 9 represents equation (19). Since the value of the reluctance torque term is 0, the total torque τ becomes a simple sine function of current phase angle β. As a result, in the range of −π≤β≤π, there is only one safe stopping point β0 that is represented, based on equation (19), as follows without being affected by equivalent circuit constants of a PMSM.

$$\beta 0 = -\pi/(2K) \qquad (20)$$

As described above, exciting the windings of the respective axes with a phase difference of π/K between them causes the only stable stopping point β0 to be defined as ββ=−π/(2K). Thus, it is possible to uniquely determine an initial position reached when the motor is DC excited.

The angle at which the motor was stably stopped by DC excitation is memorized in a position storage unit 101 shown in FIG. 8 as a rotational position with respect to the origin of the encoder 12, i.e. as an initial position C0 which is a count value of the encoder.

Next, as shown in FIG. 9, the difference βe between the current phase angle βd of the d-axis position (magnetic pole position) of the motor and the current phase angle β0 of the stable stopping point is calculated as follows.

$$\beta e = -\pi/2 + \pi/(2K) \qquad (21)$$

The count value Cd representing the d axis position (magnetic pole position) of the motor with respect to the origin of the encoder is obtained by converting βe of equation (21) into an encoder count value Ce and adding Ce to the rotational position C0 of the stable stopping point that was reached as a result of DC excitation and memorized in the position storage unit 101.

$$Cd = C0 + Ce \qquad (22)$$

The count value Cd obtained as represented by equation (22) is set as a point of origin thereby completing magnetic pole position determination. Once the magnetic pole position is initially determined as described above, the motor can be put into normal operation.

The position storage unit 101 storing position data may be a non-volatile memory such as an EEPROM, so that the position data may be retained even after the control power supply is turned off. After the motor is manufactured with data on its magnetic pole position stored in a non-volatile memory, its magnetic pole position need not be checked except when using the motor for the first time after the positional relationship between the motor shaft and the encoder is changed, for example, after the encoder is replaced.

Also, in determining the magnetic pole position of the plural-axis winding motor 11 by means of DC excitation based on current commands from the exciting current command unit 200, the current commands may be gradually increased so that they reach their prescribed values taking time from t=0 to t=tend. Doing so, rather than making the current commands immediately reach their prescribed values, can stably stop the motor by preventing generation of vibratory torques which may cause the stable stopping point β to be passed. The value of 'tend' may be determined to be about the time taken before the rotor 11b stops. Namely, it may be a time required to allow the rotational position of the plural-axis winding motor 11 to become unchanged or the rotational speed of the plural-axis winding motor 11 to become 0.

When DC excitation is started at t=0, the rotor 11b starts rotating, then stops rotating at around t=tend. Applying larger currents for a short period of time at around t=tend to obtain a larger magnetomotive force can generate a large torque for attracting the rotor 11b to the stable stopping point. This enables the magnetic pole position to be determined more precisely. As also done in determining the value of 'tend' as described above, a time around which the rotor stops may be applied as the time when to start increasing the currents.

Figure 10:
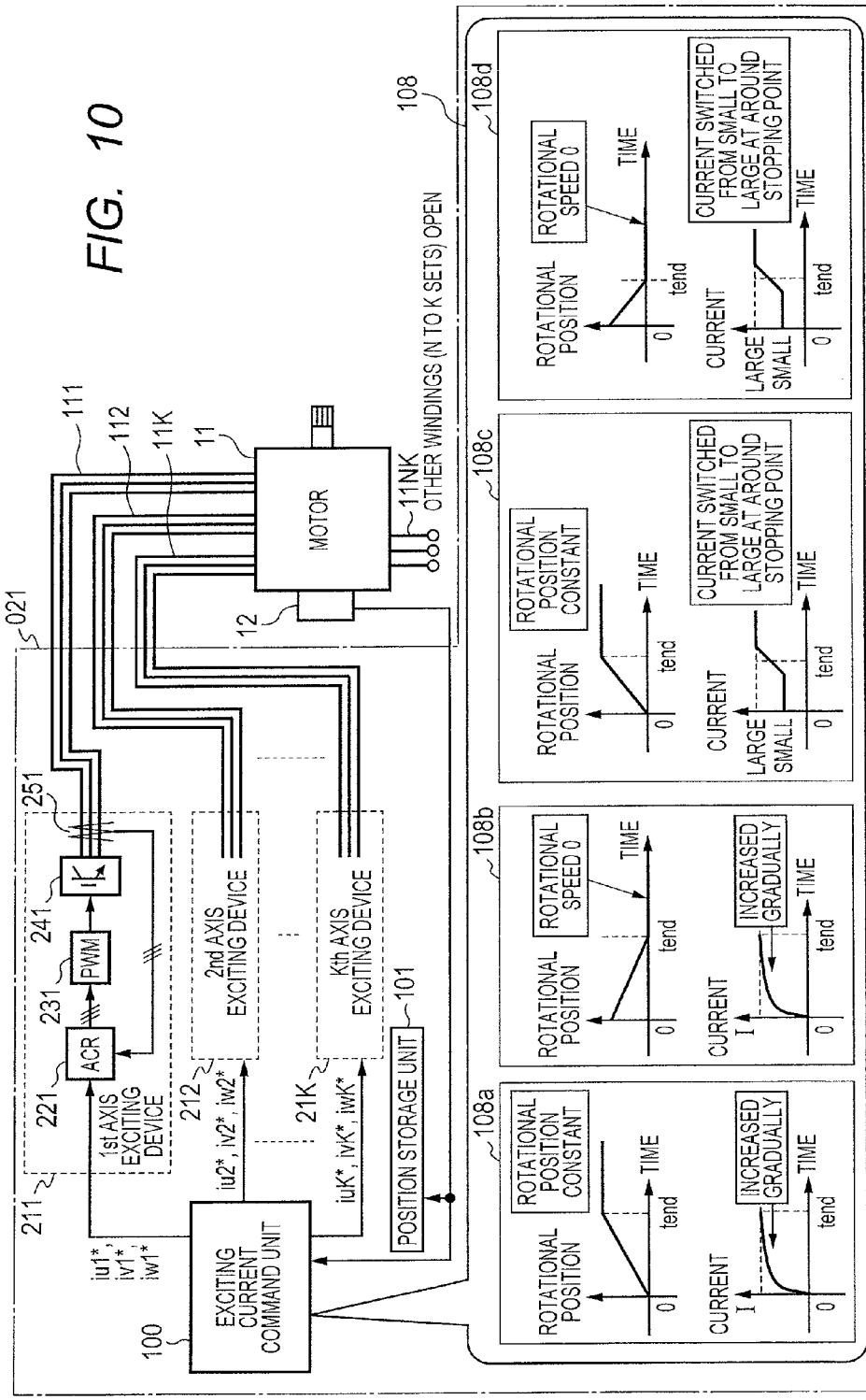
FIG. 10 is an overall view of another motor exciting device and the motor according to the first embodiment.

FIG. 10 is a schematic overall view of a motor exciting device 021 based on the above-described principle and a plural-axis winding motor 11 (number of axes K≥2). In FIG. 10, reference numerals identical to those used in FIG. 8 denote identical parts as denoted in FIG. 8. The plural-axis winding motor 11 is excited in the same way as described in connection with the motor exciting device 011 shown in FIG. 8.

The motor exciting device 021 is a second motor exciting device according to the present embodiment and is used for the plural-axis winding motor 11. In the motor exciting device 021, the rotational position information obtained by the encoder 12 is fed back to the exciting current command unit 100. The exciting current command unit 100 includes the foregoing DC exciting current commands as current changing command algorithms (shown in a lower part of 108 in FIG. 10) and issues current commands based on the algorithms, the rotational position information obtained by the encoder 12, and the rotational speed information calculated based on the rotational position information.

The current changing commands include: a command for applying a current which reaches, as shown in the lower half of 108a in FIG. 10, a prescribed value at time tend around which, as shown in the upper half of 108a in FIG. 10, the rotational position of the rotor 11b becomes constant (i.e. the rotor stops); a command for applying a current which reaches, as shown in the lower half of 108b in FIG. 10, a prescribed value at time tend around which, as shown in the upper half of 108b in FIG. 10, the rotational speed of the rotor 11b becomes 0 (i.e. the rotor stops); a command for applying a current which, as shown in the lower half of 108c in FIG. 10, sharply increases, for a short-time duration, at time tend around which, as shown in the upper half of 108c in FIG. 10, the rotational position of the rotor 11b becomes constant; and a command for applying a current which, as shown in the lower half of 108d in FIG. 10, sharply increases, for a short-time duration, at time tend around which, as shown in the upper half of 108d in FIG. 10, the rotational speed of the rotor 11b becomes 0. These current changing commands may be used in combination.

When the rotor 11b stops at a safe stopping point, the safe stopping point is memorized in the position storage unit 101. After required correction is made based on the stopping point, the motor is put into normal operation.

Figure 11:
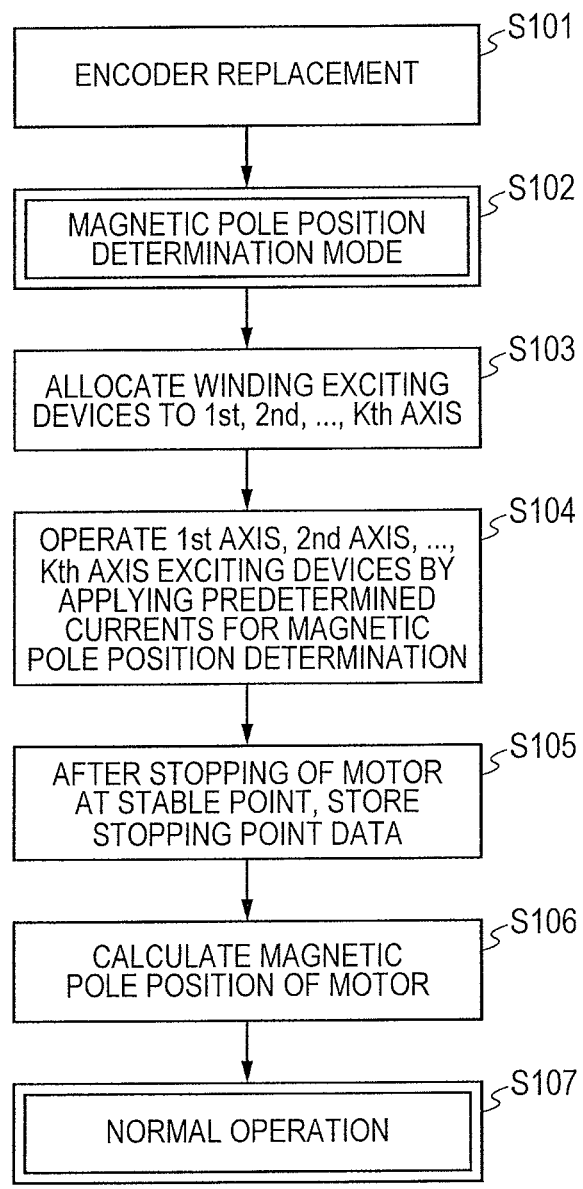
FIG. 11 is a control flowchart of the first embodiment.

With reference to the flowchart shown in FIG. 11, the above procedure for determining the magnetic pole position will be described below based on an example case in which the encoder 12 is replaced.

When the encoder 12 is replaced at step 101 (S101), it becomes necessary to determine the magnetic pole position. Hence, the device is set to magnetic pole position determination mode (S102). At this time, if necessary, the motor is put in a state of almost no load, for example, by releasing the motor brake. In magnetic pole position determination mode, select K sets of axis windings to be excited out of N sets of axis windings and allocate K exciting devices to the K sets of axis windings as the first-axis exciting device 211, the second-axis exciting device 212, - - - , the Kth-axis exciting device 21K (S103). Perform magnetic pole position determination operation by supplying predetermined current commands to the respective exciting devices for the respective axes (S104). The predetermined current commands include those for the first-axis exciting device 211 with the current values given by the foregoing equations (9), (10) and (11);

those for the second-axis exciting device 212 with the current values given by the foregoing equations (12), (13) and (14); and those for the Kth-axis exciting device 21K with the current values given by the foregoing equations (15), (16) and (17).

When the windings of the respective axes are DC excited by DC currents of a constant phase φ applied to them, the motor stops at stable stopping point β0. The stopping point is memorized in the position storage unit 101 as the rotational position of the motor with respect to the origin of the encoder 12, i.e. as an initial position (S105). Based on the initial position, the magnetic pole position of the motor is corrected by calculation (S106). After the magnetic pole position of the motor is thus determined, normal operation of the motor is started making use of the magnetic pole position (S107).

Figure 12:
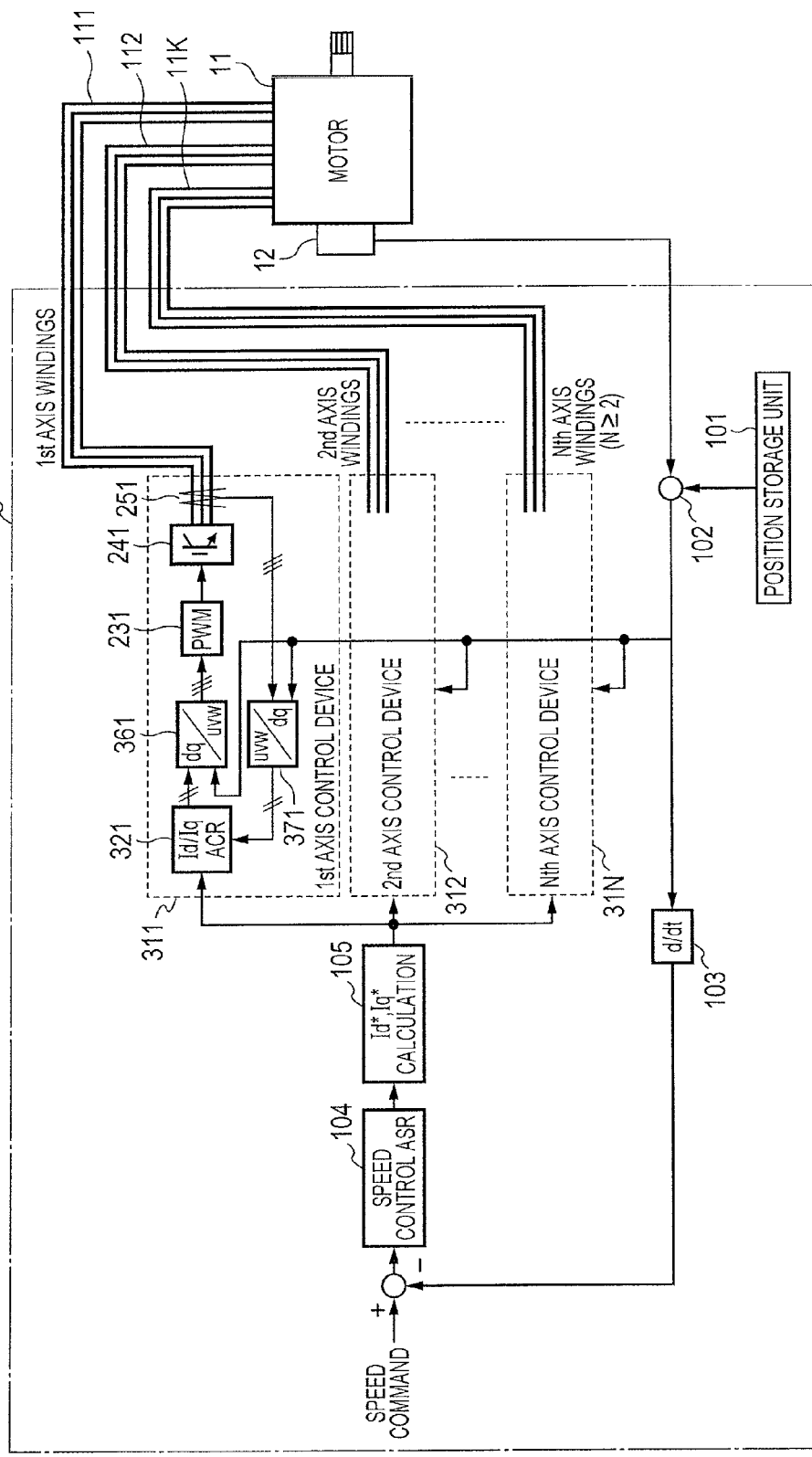
FIG. 12 is a control block diagram in a normal operating state of the first embodiment.

FIG. 12 is a control block diagram of a motor control device 012 and a plural-axis winding motor 11 connected with the motor control device 012 in a state of normal operation. In FIG. 12, reference numerals identical to those used in FIG. 8 denote parts identical to those denoted in FIG. 8. The plural-axis winding motor 11 has N axes respectively driven by independent control devices 311, 312, - - -, 31N using a driving method widely known as a vector control method for permanent magnet motors.

A rotational position signal from the encoder 12 is corrected at a correction unit 102 based on the initial position memorized in the position storage unit 101 and is outputted from the correction unit 102 as a rotational position signal with respect to the magnetic pole position. The rotational position signal is converted into a speed signal at a speed calculation unit 103 and is then inputted to the speed control unit 104. The speed control unit 104 operating based on the deviation between the speed command signal and the speed signal outputs a torque command signal to an Id*, Iq* calculation unit 105 which specifies d-axis and q-axis current components. The Id*, Iq* calculation unit 105 makes calculations to specify d-axis and q-axis current components based on the torque command signal. For example, the Id*, Iq* calculation unit 105 makes maximum torque control calculations to specify current components which, based on the current corresponding to the torque command signal, can maximize the torque generated by the plural-axis winding motor 11 and generates the corresponding current commands.

In a first-axis control device 311, an Id/Iq current control unit 321 (Id/Iq ACR) operating based on the deviation between the current commands and the current values detected by the current detector 251 and coordinate-transformed at a coordinate transformation unit 371 outputs corresponding voltage commands to a coordinate transformation unit 361 for conversion into three-phase voltage commands. The three-phase voltage commands are then inputted to the PWM control unit 231 to allow the inverter 241 to perform PWM control. In this way, the first-axis currents are controlled by the Id/Iq current control unit 321. The currents applied to the other axes are also controlled in the same manner. The control calculations described above are, as stated in the foregoing, well known as vector control for a permanent magnet motor.

Even though, in the present embodiment, the motor terminals of the plural-axis windings are independently drawn out, the present invention can also be applied to motors internally having a plural-axis winding structure. Namely, the present invention can also be applied to a motor the motor terminals of which make the motor look like a single-axis winding motor but in which the windings of plural axes (first-axis windings 111, second-axis windings 112, - - -, Nth-axis windings 11N) like those of the foregoing plural-axis winding motor 11 are connected in series or in parallel. The magnetic pole position of such a motor can easily be determined, before connecting the plural-axis wirings, by the method of the present embodiment.

Also, in the present embodiment, as represented by equations (9) to (17), the windings of the plural axes are shifted in phase from one another by −π/K, but the phases may be shifted by +π/K each. In this case, the stable stopping point β0 for the total torque generated by the motor having the plural-axis windings will be at π/(2K). Even though the current phase angle of the stable stopping point changes, the motor exciting device structured as described above can be used to obtain the same effect.

It is a basic idea of the present invention to excite the windings of K axes so as to make the effect of reluctance torque smaller than the effect of magnet torque, i.e. so as to make the magnet torque dominant over the reluctance torque. Therefore, the windings of the K axes need not be uniform in magnetomotive force. Also, a single stable stopping point is obtained even when the electrical phase difference between windings of the K axes is not exactly π/K. When a maximum torque can be obtained at a current phase angle β, almost the same magnitude of torque can be obtained at a current phase within ±3° of the current phase β causing, in many cases, no practical problem.

An example case of a motor having two-axis windings (N=2) with the current applied to the second axis 5% larger than the current applied to the first axis will be described below. In this case, the value of B×Ia in equation (4) becomes as follows.

For the First Axis:

$$B \times Ia = 0.8 \quad (23)$$

For the Second Axis:

$$B \times Ia = 0.8 \times 1.05 \quad (24)$$

Figure 13:
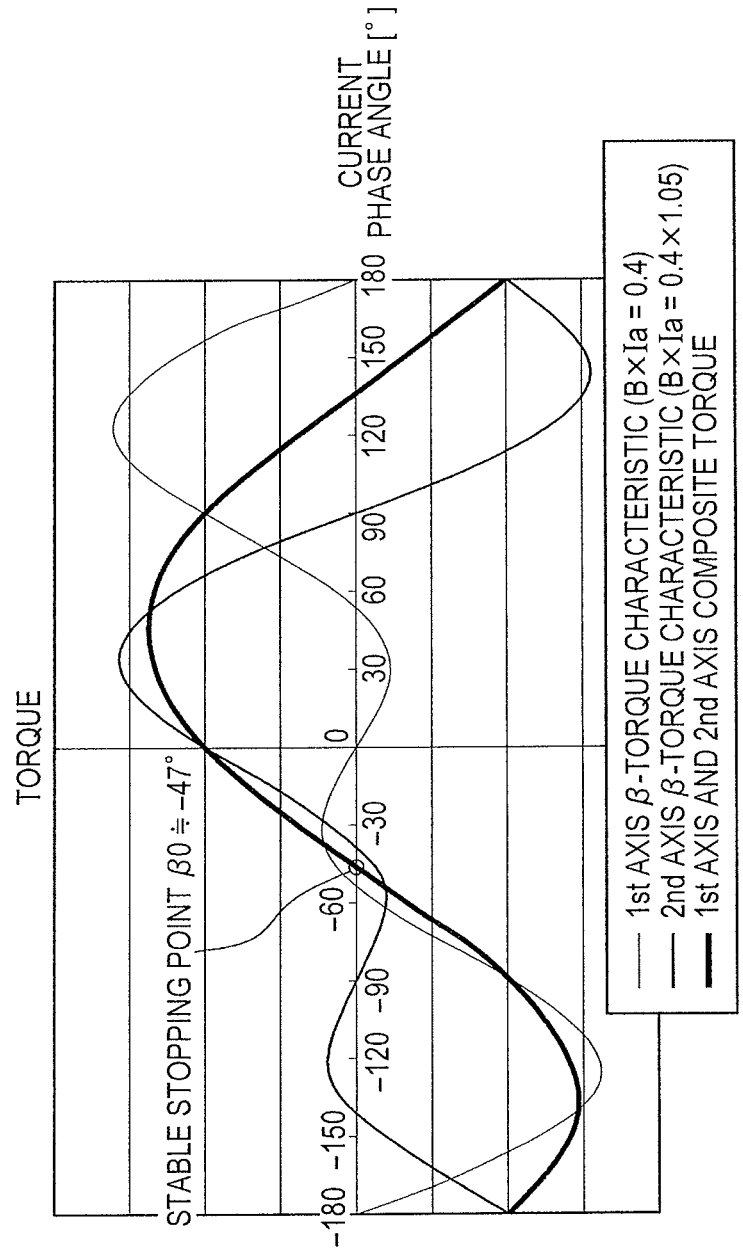
FIG. 13 is a diagram for explaining the relationship between current phase angle β and the total torque t generated by the first- and second-axis windings and a stable stopping point β0 reached when the motor is DC excited in a case where the value of B×Ia of one of the two axes is 5% larger than that of the other axis.

The total torque generated in this case by the windings of the first and second axes at current phase angle β is represented in FIG. 13. There is only one stable stopping point β0≈−47° falling within ±3° of an optimum current phase angle. In FIG. 13, the medium curve represents a first-axis β-torque characteristic, the thin curve represents a second-axis β-torque characteristic, and the thick curve represents a first-axis and second-axis composite torque.

In the case of a 5% reduction (B×Ia=0.95), too, there is only one stable stopping point β0≈−43° (not shown). Since the true stable stopping point is β0β=−π/4=−45°, the above stable stopping point β0≈−43° is within ±3° of the optimum current phase angle, so that no problem is caused.

As described above, even in cases where the currents applied to the respective axes are not strictly balanced, the intent of the present invention can be realized.

In the present embodiment, in exciting the windings of each axis, the current applied to each axis is controlled by the current command issued from the exciting current command unit 100 to the exciting device for each axis. The intent of the present invention can also be achieved using an alternative structure in which a variable DC power supply is directly connected to the U, V, and W phase terminals of each axis of the plural-axis winding motor 11.

Figure 14:
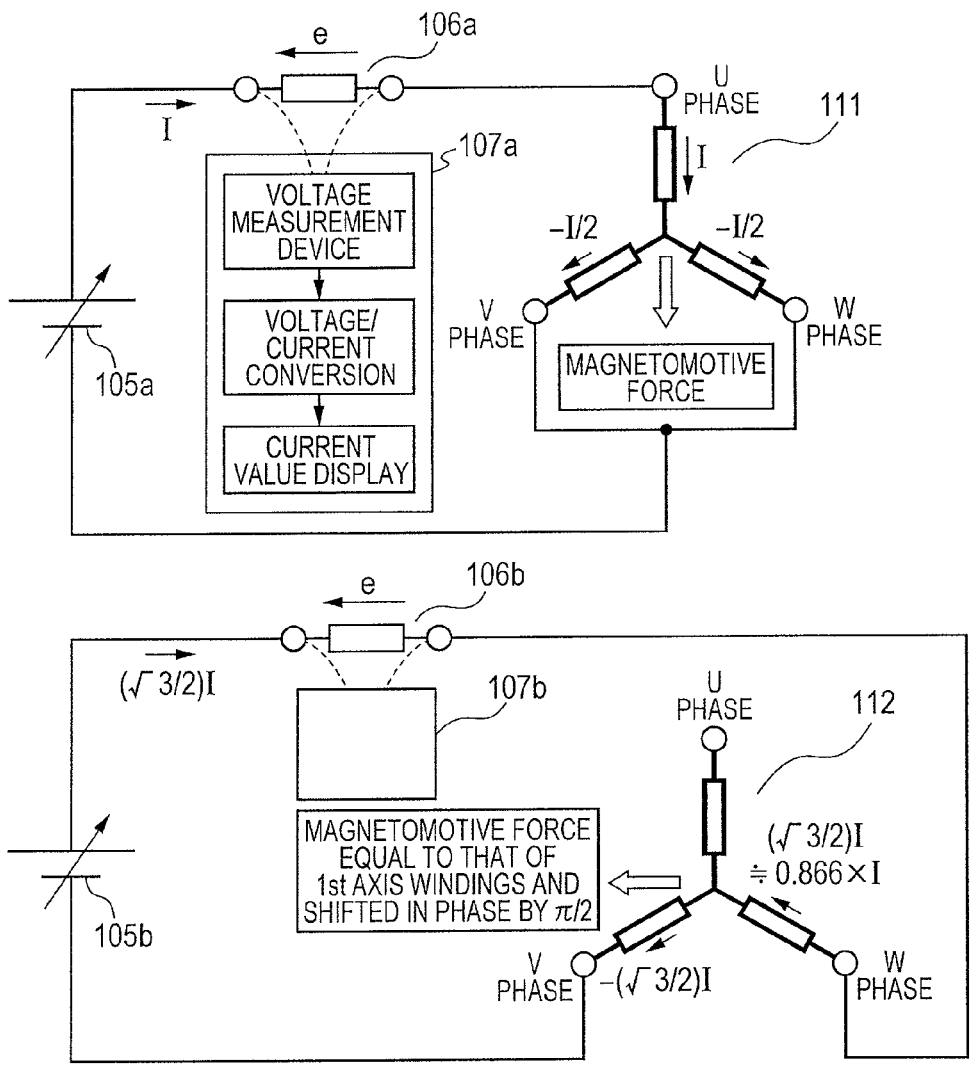
FIG. 14 shows an overall structure of an exciting device with a variable DC power supply directly connected to the windings of each axis of a plural-axis winding motor having two axes (K=2).

FIG. 14 shows a structure for exciting a motor having two-axis windings (K=2). As shown in FIG. 14, a variable DC power supply 105a is connected between U and VW of the first-axis windings 111 and a variable DC power supply 105b is connected between W and V of the second-axis windings 112. A shunt resistance 106a is interposed between the variable DC power supply 105a for the first-axis windings 111 and the first-axis windings 111. A voltage/current conversion display unit 107a converts the voltage across the shunt resistor 106a into a current and displays the current value. The DC current can be adjusted by adjusting the output voltage of the variable DC power supply 105a while watching the display.

Similarly, a shunt resistor 106b is interposed between the variable DC power supply 105b for the second-axis windings 112 and the second-axis windings 112, and a voltage/current conversion display unit 107b displays a current value as a result of voltage/current conversion. When the DC current applied to the first-axis windings 111 is adjusted to I and the DC current applied to the second-axis windings 112 is adjusted to $(\sqrt{3}/2) \times I$ ($\approx 0.8661$), the magnetomotive force of the second-axis windings becomes equal to the magnetomotive force of the first-axis windings while being shifted in phase by $\pi/2$. This causes only one stable stopping point ($\beta 0 = -\pi/4$) to exist making it possible to determine a unique initial magnetic pole position.

Figure 15:
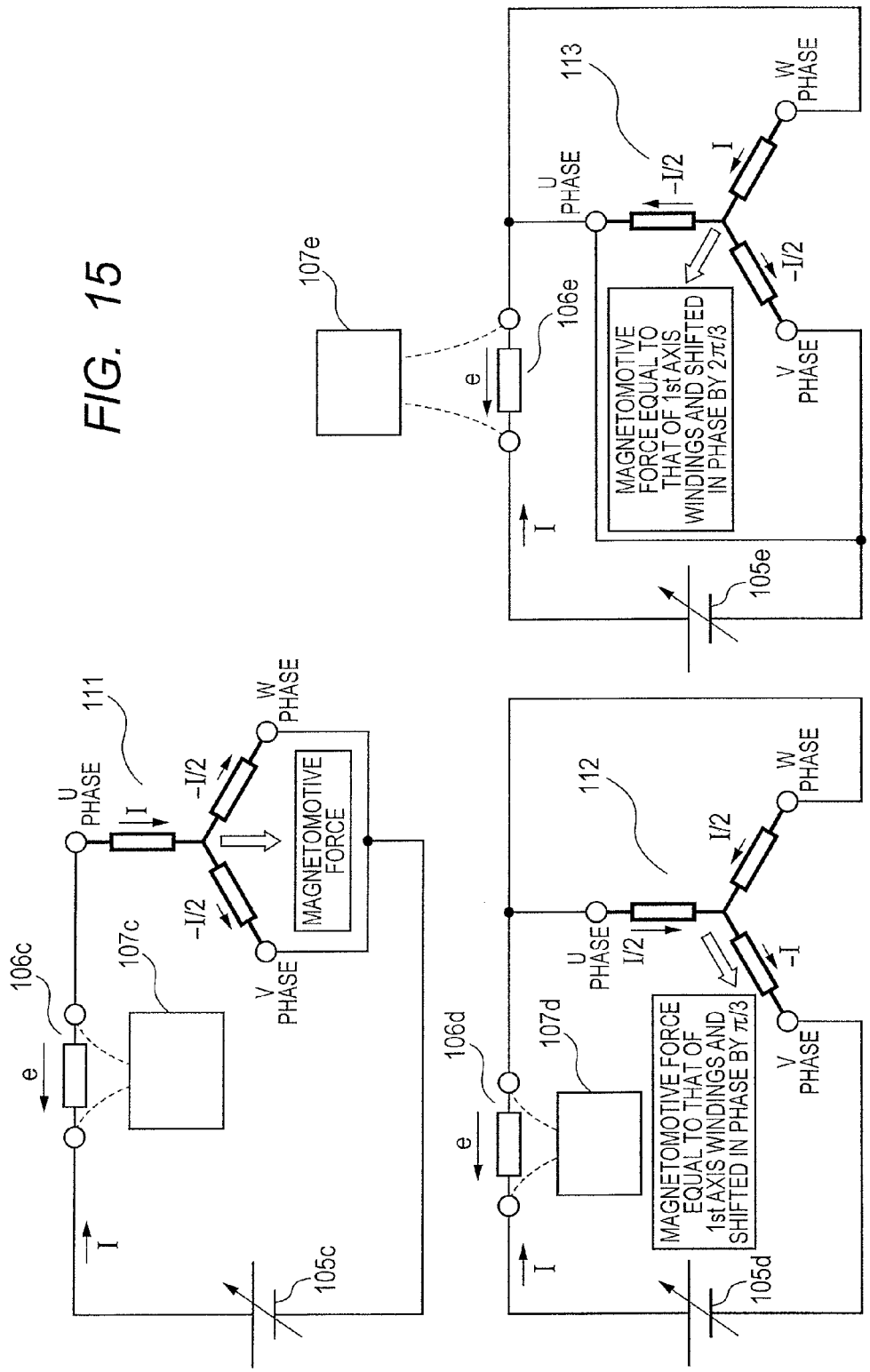
FIG. 15 shows an overall structure of an exciting device with a variable DC power supply directly connected to the windings of each axis of a plural-axis winding motor having three axes (K=3).

FIG. 15 shows a structure for exciting a motor having three-axis windings (K=3). As shown in FIG. 15, a variable DC power supply 105c is connected between U and VW of the first-axis windings 111, a variable DC power supply 105d is connected between UW and V of the second-axis windings 112, and a variable DC power supply 105e is connected between W and UV of the third-axis windings 113. Like for the above two-axis motor (K=2), shunt resistors 106c, 106d, and 106e are inserted in the windings of the three axes, respectively, and voltage/current conversion display units 107c, 107d, and 107e each display a current value as a result of voltage/current conversion. When the DC currents applied to the first-axis windings 111, second-axis windings 112, and third-axis windings 113 are adjusted to I, the magnetomotive force of the second-axis windings becomes equal to the magnetomotive force of the first-axis windings while being shifted in phase by $\pi/3$ and the magnetomotive force of the third-axis windings becomes equal to the magnetomotive force of the first-axis windings while being shifted in phase by $2\pi/3$. This causes only one stable stopping point ($\beta 0 = -\pi/6$) to exist making it possible to determine a unique initial magnetic pole position.

Even in cases where K assumes a larger value, it is possible, using a device structure similar to those shown in FIGS. 14 and 15, to obtain a single stable stopping point by adjusting the magnetomotive forces of the windings of the respective axes and phase differences between them.

What is claimed is:

1. A motor exciting device for selecting a plurality of optional axes of a permanent magnet synchronous motor having multiple-phase windings of as many as N axes (N≥2) and positionally relating an encoder and a magnetic pole position of the motor by independently exciting the windings of each of the selected plurality of axes, the motor exciting device comprising:
an exciting current command unit which generates exciting current commands for the selected plurality of axes totaling K sets (K≤N); exciting devices for individual axes which receive the exciting current commands and supply DC exciting currents to the windings of the K sets of axes; and a storage unit which stores an encoder value,
wherein the exciting devices for individual axes DC-excite the windings of the K sets of axes based on the exciting current commands such that the magnetomotive forces of the windings of the K sets of axes are shifted in phase from one another by $\pi/K$, and
wherein an encoder value collected when the motor is stably stopped by the DC excitation is stored in the storage unit as an initial position.

2. The motor exciting device according to claim 1, wherein the exciting devices for individual axes DC-excite the windings of the K sets of axes based on the exciting current commands such that the magnetomotive forces of the windings of the K sets of axes are equal.

3. The motor exciting device according to claim 1, wherein, in DC-exciting a permanent magnet synchronous motor, the exciting devices for individual axes each supply a current which gradually increases to a prescribed value.

4. The motor exciting device according to claim 2, wherein, in DC-exciting a permanent magnet synchronous motor, the exciting devices for individual axes each supply a current which gradually increases to a prescribed value.

5. The motor exciting device according to claim 1, wherein, in DC-exciting a permanent magnet synchronous motor, the exciting devices for individual axes each supply a current of a prescribed value and increase the current when the rotor of the motor stops or the rotational displacement thereof becomes zero.

6. The motor exciting device according to claim 2, wherein, in DC-exciting a permanent magnet synchronous motor, the exciting devices for individual axes each supply a current of a prescribed value and increase the current when the rotor of the motor stops or the rotational displacement thereof becomes zero.

7. The motor exciting device according to claim 1, further comprising a correction unit which corrects the rotational position of the encoder based on the initial position stored in the storage unit, wherein the motor is controlled according to a rotational position signal outputted from the correction unit.

8. The motor exciting device according to claim 2, further comprising a correction unit which corrects the rotational position of the encoder based on the initial position stored in the storage unit, wherein the motor is controlled according to a rotational position signal outputted from the correction unit.

9. The motor exciting device according to claim 3, further comprising a correction unit which corrects the rotational position of the encoder based on the initial position stored in the storage unit, wherein the motor is controlled according to a rotational position signal outputted from the correction unit.

10. The motor exciting device according to claim 4, further comprising a correction unit which corrects the rotational position of the encoder based on the initial position stored in the storage unit, wherein the motor is controlled according to a rotational position signal outputted from the correction unit.

11. A motor exciting method for selecting a plurality of optional axes of a permanent magnet synchronous motor having multiple-phase windings of as many as N axes (N≥2) and positionally relating an encoder and a magnetic pole position of the motor by independently exciting the windings of each of the selected plurality of axes, the motor exciting method comprising:
an exciting current command unit which generates exciting current commands for the selected plurality of axes totaling K sets (K≤N); exciting devices for individual axes which receive the exciting current commands and supply DC exciting currents to the windings of the K sets of axes; and a storage unit which stores an encoder value,
wherein the exciting devices for individual axes DC-excite the windings of the K sets of axes based on the exciting current commands such that the magnetomotive forces of the windings of the K sets of axes are shifted in phase from one another by $\pi/K$, and
wherein an encoder value collected when the motor is stably stopped by the DC excitation is stored in the storage unit as an initial position.

12. The motor exciting method according to claim 11, wherein the exciting devices for individual axes DC-excite the windings of the K sets of axes based on the exciting current commands such that the magnetomotive forces of the windings of the K sets of axes are equal.

13. The motor exciting method according to claim 11, wherein, in DC-exciting a permanent magnet synchronous motor, the exciting devices for individual axes each supply a current which gradually increases to a prescribed value.

14. The motor exciting method according to claim 12, wherein, in DC-exciting a permanent magnet synchronous motor, the exciting devices for individual axes each supply a current which gradually increases to a prescribed value.

15. The motor exciting method according to claim 11, wherein, in DC-exciting a permanent magnet synchronous motor, the exciting devices for individual axes each supply a current of a prescribed value and increases the current when the rotor of the motor stops or the rotational displacement thereof becomes zero.

16. The motor exciting method according to claim 12, wherein, in DC-exciting a permanent magnet synchronous motor, the exciting devices for individual axes each supply a current of a prescribed value and increases the current when the rotor of the motor stops or the rotational displacement thereof becomes zero.

17. The motor exciting method according to claim 11, wherein the motor is controlled with the rotational position of the encoder corrected based on the initial position stored in the storage unit.

18. The motor exciting method according to claim 12, wherein the motor is controlled with the rotational position of the encoder corrected based on the initial position stored in the storage unit.

19. The motor exciting method according to claim 13, wherein the motor is controlled with the rotational position of the encoder corrected based on the initial position stored in the storage unit.

20. The motor exciting method according to claim 14, wherein the motor is controlled with the rotational position of the encoder corrected based on the initial position stored in the storage unit.

* * * * *